April 9, 1957
C. E. CUSHMAN
2,787,916
CABLE TENSION REGULATOR
Filed Nov. 23, 1953
3 Sheets-Sheet 2
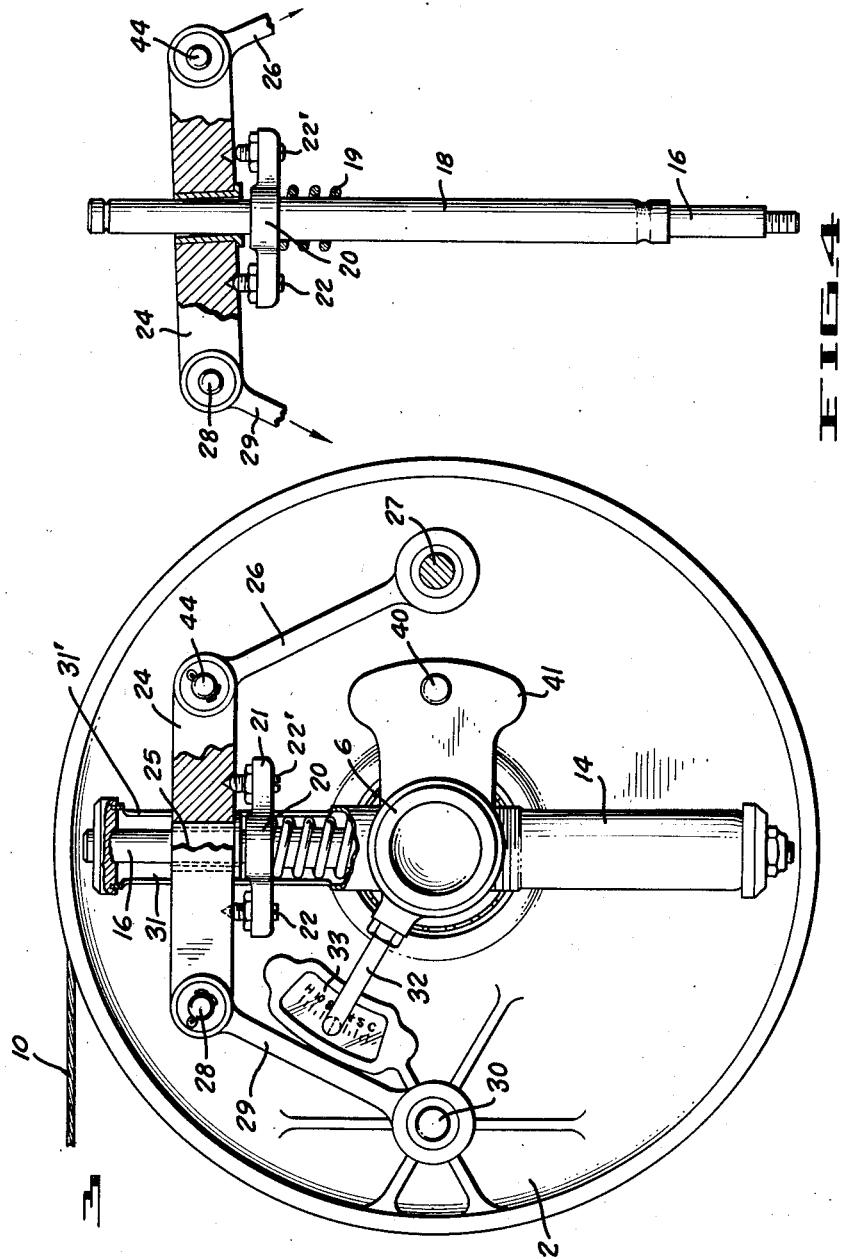
INVENTOR.
CLIFFORD E. CUSHMAN
BY
Paul B. Hunter
ATTORNEY April 9, 1957  C. E. CUSHMAN  2,787,916
CABLE TENSION REGULATOR
Filed Nov. 23, 1953  3 Sheets-Sheet 3

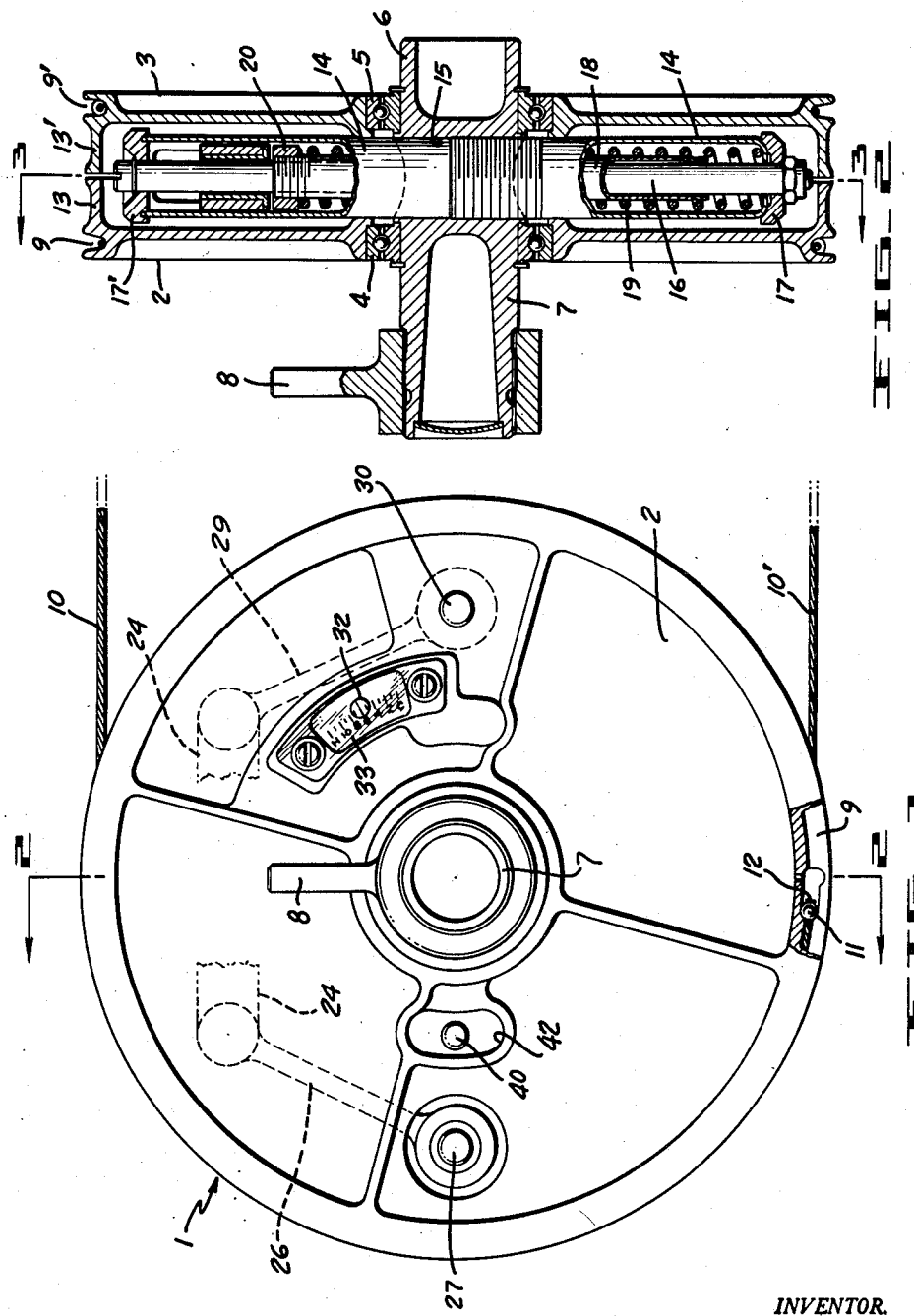

INVENTOR.
CLIFFORD E. CUSHMAN
BY
Paul B. Hunter
ATTORNEY

United States Patent Office 2,787,916
Patented Apr. 9, 1957

2,787,916

CABLE TENSION REGULATOR

Clifford E. Cushman, Burbank, Calif., assignor, by mesne assignments, to Pacific Scientific Aeroproducts, Glendale, Calif., a corporation of California Application November 23, 1953, Serial No. 393,730

8 Claims. (Cl. 74—501.5)

This invention relates generally to cable tension regulators, and has reference more particularly to a novel cable tension regulator adapted for use in connection with control cables for operating engine throttles and the control surfaces such as ailerons, elevators, rudders, on aircraft and other vehicles, the said cable tension regulator being designed to eliminate backlash or lost motion between the controlling means such as a control stick and the member controlled.

Cable tension regulators generally have spring means intended to keep the rig tension of the cables constant and substantially equal when the control cables are not being operated in order to compensate for temperature changes and other factors tending to cause the cables to become slack or tight under varying conditions of use. Thus, such cables are at times quite long, and their coefficients of expansion and contraction might be quite different from that of the air frame itself, resulting in considerable slack being encountered in the cables, making the controls "mushy" if means is not provided for correcting for such expansions and contractions, resulting from temperature and other changes including deflections of the air frame.

These cable tension regulators as heretofore constructed are generally equipped with a mechanism which will operate as a brake or lock to prevent the regulator from compensating when unsymmetrical or control loads are applied. If the regulator were to compensate during the application of control loads, i. e., if the regulator would permit the cables to change in length during a control operation, such a control system would feel mushy, and would actually result in reducing the amount of controlled member or surface travel relative to the movement of the controls in the cockpit of an airplane, for example. These cable tension regulator brakes, however, have to be designed so that when variable symmetrical loads are applied to the regulator, such as would occur resulting from temperature variations or structural deflections of the aircraft, for example, the regulator brake will not operate and will allow the regulator to compensate freely for such variations in tension. Cable regulators, however, as heretofore constructed require a certain amount of rotational movement of the cockpit controller such as the control stick and of the regulator without a corresponding movement of the controlled member before the brake becomes operative. Thus, prior art regulators inherently possess a certain amount of backlash or lost motion, and this condition is highly objectionable particularly in high speed modern aircraft. As an aircraft's speed increases, the susceptibility of control surfaces to flutter likewise increases. If a control surface has a tendency to flutter, the flutter can be greatly reduced or substantially eliminated by the use of a snug control system, because such a system requires any flutter of the control surface to cause a corresponding movement of every other member of the control system to which the control surface is connected. On the other hand, if there is lost motion or slack in the control system, as is true of systems heretofore built, the control surface can oscillate through a small arc without correspondingly moving the rest of the system, and this is highly objectionable and dangerous. The amplitude of such oscillations depends upon the amount of slack or lost motion in the system; hence, there exists the desirability of having a system that is snug so that the forces generating the flutter are required to overcome the friction and inertia of the whole system rather than that of the control surface alone, thus substantially eliminating flutter.

Further, as the ratio of top speed to landing speed becomes greater, the control system operating forces are also increased. This has brought about the use of power boost controls and full power control systems. On airplanes equipped with power control systems, the cockpit controls are connected to hydraulic valves, which in turn control the operation of hydraulic servos which are attached to the control surfaces. In a power system, therefore, movements of the cockpit controls open and close sensitive hydraulic valves, and, since these valves are sensitive to small control movements, it is important that lost motion in the system connecting the cockpit controls to the control valves be reduced to a minimum. Also, for about 25% of the R. P. M. range, jet engines are very sensitive to changes in the throttle position. This characteristic of jet engines does not exist in piston engine installation. Therefore, with the advent of the jet engine, it becomes increasingly important to reduce throttle control system lost motion to a minimum.

The principal object of the present invention is to provide a novel cable tension regulator so constructed and arranged as to provide for minimum lost motion between the controlling and controlled members, while at the same time allowing for changes in the spacing of the controlling and controlled members due to temperature changes, air frame deflections, etc.

Another object of the present invention is to provide a novel cable tension regulator having a brake by-pass or minimum lost motion mechanism incorporated therein, to enable the operation of a controlled member or surface from a control member without backlash.

Another object of the present invention is to provide a novel cable tension regulator which is of simple and rugged construction and inexpensive to manufacture.

Another object of the present invention is to provide a novel cable tension regulator capable of taking up large expansion differentials due to temperature variations or to other causes, while at the same time providing a snug control system suitable for use with high speed jet aircraft.

These and other objects and advantages of the present invention will become more apparent from a perusal of the following specification taken in connection with the accompanying drawings wherein:

Fig. 1 is a view in side elevation of the novel cable tension regulator of this invention shown with cables attached thereto.

Fig. 2 is a sectional view taken substantially along the line 2—2 of Fig. 1, looking in the direction of the arrows.

Fig. 3 is a part sectional view taken along the line 3—3 of Fig. 2, looking in the direction of the arrows.

Fig. 4 is a fragmentary view illustrating the operation of the brake by-pass mechanism of this invention.

Similar characters of reference are used in the above figures to designate corresponding parts.

Figure 5:
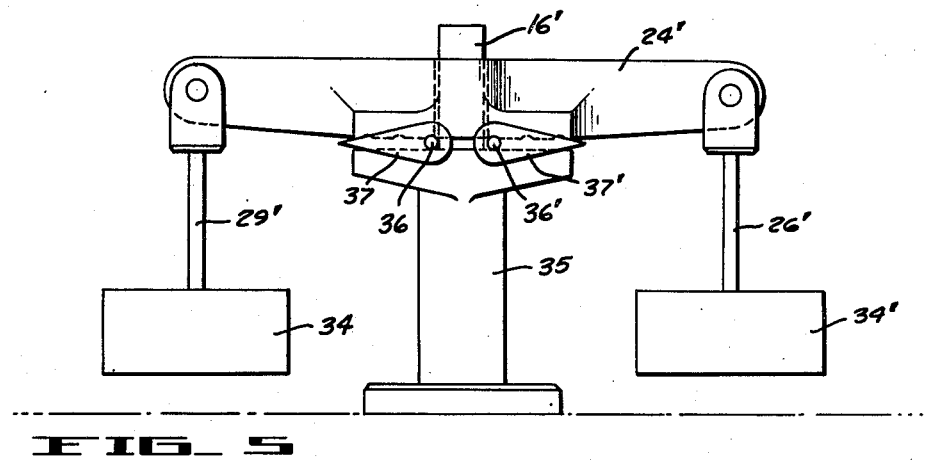
Figs. 5, 6 and 7 are diagrammatic views illustrating the theory of operation of the brake by-pass mechanism.

Referring now to Figs. 1 through 4, the novel cable tension regulator 1 is shown consisting of a pair of concentric drums or sheaves 2 and 3 arranged in opposed relation with respect to each other and turnably mounted on ball bearings 4 and 5 carried by a shaft 6. Shaft 6 is provided with a projection 7 adapted to have a work arm 8 securely fixed thereto. This work arm may be connected for either imparting control movements to the regulator as where this regulator is mounted in the cockpit, or for receiving its motion from the regulator as where the regulator is mounted adjacent to the control surface. Thus, the regulator may be used either at the transmitting or receiving ends of the servo system. Where the regulator is used at the receiving end of the system, the arm 8 would be connected through suitable linkage for actuating the controlled member or surface.

The sheaves 2 and 3 are provided with circumferential grooves 9 and 9' for accommodating control cables 10 and 10', cable 10 having a ball termination 11 adapted to fit into a socket 12 (see Fig. 1) formed within the groove 9 of sheave 2, and the cable 10' being similarly connected to sheave 3 at a point preferably substantially diametrically opposite the point of connection of ball 11 to sheave 2. The sheaves 2 and 3 are formed with circumferential inwardly directed flanges 13 and 13' which together with the remainder of these sheaves and the shaft 6, completely house the operating mechanism of the regulator.

This mechanism comprises a cylindrical spring housing 14 that extends transversely through and is threaded within an aperture 15 provided in the shaft 6. An axial rod or shaft 16 extends longitudinally within spring housing 14 and is centered within this housing as by end centering collars 17 and 17'. Slidably mounted upon the rod 16 is a fulcrum bar support and guide tube 18 which is surrounded by a compression spring 19 resting thereupon and contained within the housing 14. One end of spring 19 bears against an end of housing 14 and the other end presses against the hub 20 of a fulcrum bar 21 that is centrally internally threaded upon the upper end portion of the spring guide tube 18, as viewed in the figures. The fulcrum bar 21 is provided near its outer free ends with fulcrum pins or screws 22 and 22' locked thereon as by lock nuts. These fulcrum pins extend upwardly as viewed in the figures, and engage the underside of a transversely extending brake bar 24 having a central enlarged hub portion 25 which is centrally apertured so as to slide freely on the shaft 16. Preferably, the fulcrum pins 22 and 22' have bevelled upper ends which engage within conforming recesses provided in the under surface of the brake bar 24, as better shown in Figs. 3 and 4. This brake bar extends outwardly through opposed longitudinal slots 31 and 31' provided in the diametrically opposite sides of the spring housing 14. One end of the brake bar 24 is pivotally connected as by a pin 44 to one end of a link 26, the other end of the link being pivotally connected as by pin 27 to the sheave 3. The other end of the brake bar 24 is connected through pin 28, a similar link 29, to a pin 30 fixed upon the sheave 2.

In use, the compression spring 19, acting through fulcrum bar 21 and pins 22 and 22', serves to urge the transverse brake bar radially outwardly, thereby urging links 26 and 29 outwardly, so that these links being respectively connected to sheaves 3 and 2, tend to turn these sheaves in opposite directions to maintain cables 10 and 10' tight and at the desired rig loading. Now, assuming that the arm 8 of the regulator is connected to the controlled member or surface and that the cables 10 and 10' extend to the cockpit and are connected to the controller sheave or to a suitable control lever as is well known, the action of the spring 19 serves to maintain the desired tension or rig load on the cables, such cables being tensioned equally. The amount of rig or static load on the cables is indicated by a pointer 32 which is fixed upon the shaft 6 and extends to underlie a transparent indicator plate or window 33 carried by the sheave 2, the numbers marked on the window cooperating with the pointer 32 to provide an indication of the rig load or tension in the cables.

Thus, for example, if the regulator is being used in a throttle control system, the initial tension set up in the cables by the spring 19 may be of the order of 6 to 15 lbs. On the other hand, if the regulator is to be used in connection with operating a control surface, the tension in each of the cables may be of the order of 22 to 38 lbs. As the cables 10 and 10' tend to stretch or contract in accordance with variations in temperature or air frame flexure, the spring 19 automatically acts to move brake bar 24 inwardly or outwardly of rod 16 to move sheaves 2 and 3 in opposite directions to compensate for such temperature or other changes and maintain the tension in the cables substantially constant, so that no slack develops in these cables. Thus, the regulator compensates for all changes in symmetrical loads carried by the cables.

The action of the regulator, when a control movement is applied to the cables, i. e., resulting in the application of unsymmetrical loads to the cables, can be better explained by reference to the diagrams of Figs. 5 through 7.

In Fig. 5, a bar 24' corresponding to the brake bar 24 is shown slidably mounted upon a rod 16' corresponding to axial rod 16. The ends of the bar 24' carry weights 34 and 34' suspended from links 26' and 29'. The bar 24' is shown supported upon a pedestal 35 by means of transverse loose pins 36 and 36' which have pointers 37 and 37' extending from corresponding ends thereof, the pointers 37 and 37' being shown in Fig. 5 as extending transversely in opposite directions. The pins 36 and 36' are shown in Fig. 5 as being positioned immediately adjacent the shaft 16'. Bar 24', for purposes of demonstration, may be provided with shallow transverse notches for accommodating the pins, the weights 34 and 34' corresponding to the rig tension in the cables. Now, if a relatively small additional weight 38 is applied to one side of the bar 24' corresponding to the application of a small control load to that side, i. e., the left-hand cable as viewed in Fig. 5, then the weight 34 plus that of weight 38 will cause the bar 24' to turn upon pin 36, as better shown in Fig. 6, raising weight 34'. This turning movement of the bar 24' causes the same to bind upon the shaft 16' as illustrated in the drawings, so that if the pedestal 35 were replaced by a spring, there would be no deflection of the spring due to the addition of the weight 38, since the bar 24' binding upon the shaft 16' would be prevented from moving along the shaft. The tilting of the bar 24', however, is well demonstrated by the pointer 37' falling downwardly under its own weight, since the pin 36' is now freed of the frictional grip of the bar 24' thereupon.

The reason only a relatively small weight 38 was required to tilt the bar 24' is that the moment arm between pivot pin 36 and link 29' is substantially equal to the moment arm between pin 36 and link 26' carrying weight 34', the extra length of the second arm being merely that due to the small spacing of the pins 36 and 36'. On the other hand, if these pins are moved outwardly from shaft 16' as shown in Fig. 7, which can be accomplished in the regulator by use of the fulcrum bar 21 as shown in Fig. 3, the addition of a relatively heavy weight 38' will not cause the bar 24' to tilt, and this is because the moment arm between link 29' and pin 36 is relatively small compared to the moment arm between pin 36 and link 26', bearing in mind that any turning of the bar 24' due to the presence of weight 38' would be about the pin 36 as a pivot, and this action has not taken place because weights 38' and 34 added together, multiplied by their moment arm, would be less than the weight 34' times its relative long moment arm.

The application of this principle will now be applied to the operation of the present regulator. In regulators as heretofore constructed where a brake bar is employed upon a shaft, such as Cade Patent #2,363,228, the brake bars are pivoted directly thereon, so that a relatively minor increase in control force on one cable over that of the other would effect the turning of the brake bar on the shaft and the locking of the same against movement along the shaft. When this occurs, a certain amount of backlash is put into the system, because the cables are allowed to have a certain amount of motion dependent upon the extent of angular movement of the bar without a corresponding movement of the remainder of the control system taking place. This will be apparent when reference is made to Fig. 3 of the drawings wherein, if it is assumed that the fulcrum bar 21 were not present so that brake bar 24 turned directly on rod 16 and then cables 10 and 10′ are moved by a control load so as to tilt the bar 24, the motion of this bar during tilting and that of the connecting links takes effect without any motion of the shaft 6 and work arm 8 taking place, so that to this extent there would be backlash in the system, which is so objectionable for many uses. However, with the fulcrum bar 21 present for normal control loads applied to the cables the difference in cable tensions is insufficient to cause the brake bar 24 to pivot upon either of the fulcrum pins 22 or 22′ since these pins are spaced outwardly from the shaft 16 corresponding to the location of pins 36 and 36′ in Fig. 7, so that in effect there is no locking of the bar 24 upon the shaft 16 during ordinary control movements requiring normal differential tensions between cables 10 and 10′. Thus, the fulcrum bar 21 with pin fulcrums 22 and 22′ acts as a minimum lost motion device for all ordinary uses of the regulator. This operation may be explained another way as follows:

Assume that the minimum lost motion device comprising the fulcrum pins 22 and 22′ and bar 21 is not present and that the bar 24 were free to pivot upon rod 16 at the top of the spring; then assume, for example, that the rig load, i. e., the tension normal in each cable 10 and 10′ is 30 lbs., so that 30 lbs. is applied through links 26 and 29 to each end of the brake bar 24; now assume that a control load is applied to one side of the system, such as to cable 10 for example, which will increase the load on link 29 from 30 to 35 lbs. and this will simultaneously reduce the load on link 26 to 25 lbs., it being apparent that as a control member applies tension to one cable it automatically slacks off tension on the other cable to the same extent, the combined tensions in both cables remaining 60 lbs. as before, and only the distribution has been changed; there is no deflection of the spring 19, however, because before the application of the control load there was 30 plus 30 or 60 lbs. applied to the spring, and, after the control force is applied, there is 25 plus 35 or still 60 lbs. pressure applied to the spring.

Figure 6:
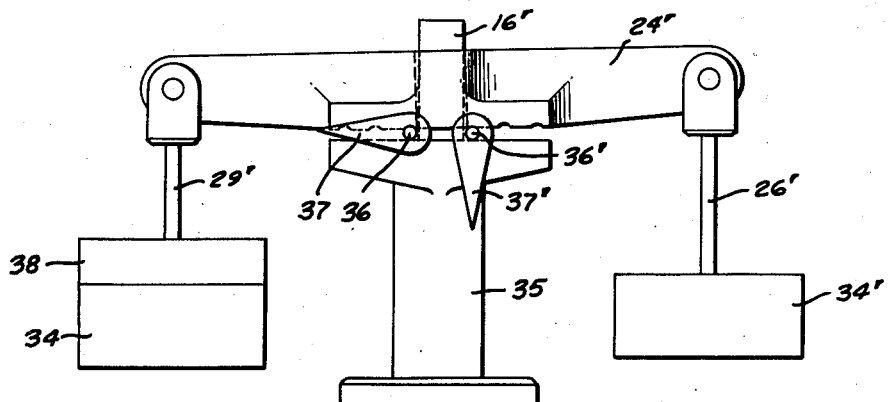
Figure 7:
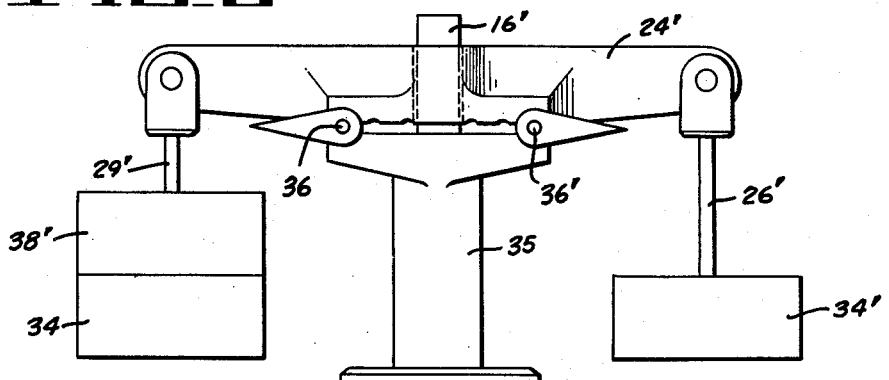

However, since the minimum lost motion device is assumed not to be present, the bar 24 will pivot as illustrated in Figs. 5 and 6 of the drawings, and cause bar 24 to lock upon shaft 16 although such locking is not necessary for the functioning of the device since the pressure or compression of spring 19 is not changed. However, an objectionable feature has arisen in that a certain amount of lost motion has been ejected into the system due to the pivotal movement of bar 24. This will be apparent when it is noted that, when this bar tilts corresponding to the manner illustrated in Fig. 6, the pin 27 will move upwardly as shown in Fig. 3 and the pin 30 will move downwardly indicating a relative turning of the two sheaves 3 and 2 corresponding to a certain movement of the control member without any corresponding motion of shaft 6, and hence of the controlled member connected to arm 8, or vice-versa the controlled member may flutter without a corresponding movement of the shaft 6 and connected control member. Thus, this lost motion in the system not only results in improper following of the control surface from the controlling member but also permits flutter of the control surface.

In case of a throttle control, improper engine speeds would result, since the position of the throttle valves would not conform to the position of the throttle control handle, and this is highly objectionable, particularly in high speed aircraft using jet engines.

With the novel minimum lost motion device present, however, as shown in Fig. 3, the 5 lb. differential in tension between cables 10 and 10′ would not effect tilting of the brake bar 24 owing to the fact that the effective moment arm of the cable having the higher tension is much less than that of the cable having the lesser tension.

For example, if 35 lbs. is applied to cable 10, and hence applied to link 29, this larger force acting through a relatively short moment arm extending from pin 28 to pin 22 cannot overcome the lesser force of 25 lbs. applied to link 26 and acting over the relatively long moment arm from pin 44 to pin 22. Further, since the combined load in the cables is still 60 lbs. the spring 19 is not compressed or expanded so that the controls are not "mushy," and there is no backlash in the system resulting in the accurate following motions of the control member by the controlled member, and this is true for relatively substantial control forces being applied, for, if friction, cable deflection and other uncontrollable factors were not present, the control load could increase up to a maximum of twice the rig load without the bar 24 tilting. In emergencies, however, excessive control loads may be applied, in which case the brake bar 24 will fulcrum on either pin 21 or 22 and lock on rod 16 preventing compression of spring 19, so that the controls do not become "mushy" even during such emergencies. Fig. 4 shows the tilting of the brake bar 24 under these conditions and the braking of this bar on the rod 16 so that spring 19 becomes ineffective. A pin 40 projecting from a boss 41 provided on shaft 6 (see Figs. 1 and 3) is shown extending into an arcuate slot 42 in sheave 2 to limit the compensating movement of the device.

Since many changes could be made in the above construction of the novel cable tension regulator of this invention and many apparently widely different embodiments of this invention could be made without departing from the scope thereof, it is intended that all matter contained in the description or shown in the accompanying drawings shall be interpreted as illustrative and not in a limiting sense.

What is claimed is:

1. A cable tension regulator having a shaft, a pair of opposed sheaves rotatably mounted on said shaft and adapted to have control cables attached thereto, and operating mechanism enclosed within the space between said sheaves, said mechanism comprising guide means extending transversely through said shaft and carried thereby, a transverse brake bar slidably mounted on said guide means, said brake bar being tiltable with respect to said guide means for braking thereon, linkage connecting the ends of said brake bar to said sheaves respectively for actuating said sheaves in accordance with longitudinal movements of said brake bar along said guide means, a compression spring carried by said guide means, and a minimum lost motion means interposed between said spring and said brake bar whereby said spring is free to act through said minimum lost motion means to move said brake bar longitudinally along said guide means to effect opposite turning of said sheaves to compensate for changes in elongation of the cables and to permit normal control forces to effect operating control movements of said cables and sheaves without braking action of said brake bar on said guide means, said lost motion means acting, upon the application of excessive control forces, to cause the braking of said brake bar upon said guide means.

2. A cable tension regulator as defined in claim 1, wherein said minimum lost motion means comprises a fulcrum member movable with said spring and interposed between the end thereof and said brake bar, said member providing pivots for supporting said brake bar on opposite sides of said guide means, said pivots being spaced outwardly a distance from said guide means.

3. In a cable tension regulator having opposed sheaves turnably mounted on a shaft and enclosing an operating mechanism therewithin having a guide member, a spring urged brake bar slidably mounted on said member and connected through linkage to said sheaves respectively for urging the same to turn in opposite directions, a minimum lost motion device interposed between the spring and the brake bar comprising, a fulcrum bar bearing on the end of the spring and extending outwardly in opposite directions therefrom and in underlying relation to the brake bar, the outer end portions of said fulcrum bar having pivotal pins carried thereby for engaging said brake bar at points substantially removed from the center thereof and from said guide member to thereby prevent tilting movement of said brake bar and the braking of the same on said guide member except upon the application of excessive control loads to said cable sheaves.

4. In a cable tension regulator, a shaft, a pair of opposed sheaves turnably mounted on said shaft, each of said sheaves being adapted to receive the end of a flexible control cable, a guide member diametrically extending through said shaft and fixed thereon so as to be carried thereby, a rod extending axially within said guide member and carried thereby, a centrally apertured brake bar slidable on said rod and extending outwardly through apertures in said guide member and at opposite sides of said rod, linkage connecting the ends of said brake bar to said sheaves respectively, spring means enclosed by said guide member, and a minimum lost motion device interposed between said spring means and said brake bar for moving the latter under the action of said spring along said rod to compensate for variations in tension of said cables, said minimum lost motion device supporting said brake bar at opposite points removed from said guide member for enabling application of control loads to said cables without the braking of said brake bar upon said rod except when said control loads are excessive.

5. A cable tension regulator as defined in claim 4 wherein said minimum lost motion device comprises a fulcrum bar interposed between said spring means and said brake bar and providing pivotal supports for said brake bar adjacent the ends of said fulcrum bar remote from said rod.

6. In a cable tension regulator, a shaft member, a pair of sheaves turnably mounted on said shaft member, each of said sheaves being adapted to receive an end of a control cable, a diametrically extending guide carried by said shaft member, a brake bar slidably mounted on said guide and extending oppositely from the sides thereof, link connectors interconnecting the ends of said bar and said respective sheaves, spring means carried by said guide and acting upon said brake bar for moving said sheaves to maintain a desired rig tension in said control cables, and a minimum lost motion device comprising a fulcrum bar also slidable on said guide and engaging said spring means on one side and said brake bar at spaced pivotal points on the other side removed from said guide for preventing the locking of said brake bar upon said guide on the application of normal control loads to said control cables.

7. A cable tension regulator as defined in claim 6, wherein the application of excessive control loads to said control cables results in the pivoting of said brake bar about one of said pivotal supports of said fulcrum bar to thereby lock the brake bar upon the guide and prevent deflections of said spring means.

8. In a cable tension regulator, a shaft, a pair of sheaves each adapted to receive an end of a flexible control cable mounted for rotation on said shaft, a mechanism included between said sheaves and operatively connected thereto for rotating them in opposite directions, said mechanism comprising a spring and motion transmitting means interposed between said spring and said sheaves, said motion transmitting means including locking means, and a minimum lost motion device coacting with said locking means for preventing said locking means from locking said sheaves against relative movement during ordinary control movements of said regulator but permitting said locking means to lock said sheaves against relative motion upon the application of excessive control forces to said cables.

References Cited in the file of this patent
UNITED STATES PATENTS

| | | |
|---|---|---|
| 2,341,273 | Helberg | Feb. 8, 1944 |
| 2,363,228 | Cade | Nov. 21, 1944 |
| 2,423,483 | Clark | July 8, 1947 |
| 2,581,080 | Cushman | Jan. 1, 1952 |
| 2,585,358 | Weber | Feb. 12, 1952 |